(12) United States Patent
Niemz

(10) Patent No.: US 8,457,843 B2
(45) Date of Patent: Jun. 4, 2013

(54) DEVICE AND METHOD FOR CONTROLLING AN AUTOMATIC STEERING SYSTEM OF A VEHICLE, AND DEVICE AND METHOD FOR CHECKING THE ABILITY TO IMPLEMENT A PREDEFINED SETPOINT TRAVEL DIRECTION VARIABLE FOR A VEHICLE

(75) Inventor: Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 12/737,251

(22) PCT Filed: Nov. 17, 2008

(86) PCT No.: PCT/EP2008/065695
§ 371 (c)(1),
(2), (4) Date: Mar. 3, 2011

(87) PCT Pub. No.: WO2009/156002
PCT Pub. Date: Dec. 30, 2009

(65) Prior Publication Data
US 2011/0144865 A1    Jun. 16, 2011

(30) Foreign Application Priority Data

Jun. 27, 2008    (DE) .......................... 10 2008 002 699

(51) Int. Cl.
| B62D 6/00 | (2006.01) |
| B62D 1/00 | (2006.01) |
| B62D 5/00 | (2006.01) |
| B62D 5/04 | (2006.01) |
| B60S 9/00 | (2006.01) |
| B60Q 1/48 | (2006.01) |
| G06F 7/02 | (2006.01) |

(52) U.S. Cl.
USPC ................. 701/41; 701/36; 701/42; 180/204; 180/443; 340/932.2

(58) Field of Classification Search
USPC ............... 701/1, 2, 23, 36, 41, 42, 43, 44, 11, 701/25, 72; 340/932.2; 180/443, 446, 204, 180/6.2
See application file for complete search history.

(56) References Cited

U.S. PATENT DOCUMENTS

| 6,374,167 B2 * | 4/2002 | Iwazaki .......................... 701/41 |
| 6,519,514 B2 * | 2/2003 | Mizutani ......................... 701/23 |

(Continued)

FOREIGN PATENT DOCUMENTS

| DE | 199 02 096 A1 | 8/1999 |
| DE | 199 22 173 | 11/1999 |

(Continued)

*Primary Examiner* — Behrang Badii
*Assistant Examiner* — Dale W Hilgendorf
(74) *Attorney, Agent, or Firm* — Kenyon & Kenyon LLP (57) ABSTRACT

A device for controlling an automatic steering system of a vehicle includes a signal input which receives a setpoint travel direction variable, a memory device on which a correction factor is stored, a control unit which ascertains a corrected setpoint travel direction variable on the basis of the correction factor and the predefined setpoint travel direction variable, and an evaluation device which compares an actual travel direction variable ascertained by a sensor of the vehicle to the predefined setpoint travel direction variable, and if the actual travel direction variable deviates from the predefined setpoint travel direction variable by at least a minimum difference, redefines the correction factor according to the comparison.

14 Claims, 7 Drawing Sheets

U.S. PATENT DOCUMENTS

| | | | |
|---|---|---|---|
| 6,885,926 B2 * | 4/2005 | Iwazaki | 701/41 |
| 7,075,456 B2 * | 7/2006 | Tanaka et al. | 701/41 |
| 7,356,396 B2 * | 4/2008 | Mori et al. | 701/41 |
| 7,487,020 B2 * | 2/2009 | Iwazaki et al. | 701/41 |
| 7,679,495 B2 * | 3/2010 | Beutnagel-Buchner et al. | 340/435 |
| 2006/0131096 A1 | 6/2006 | Ono et al. | |

FOREIGN PATENT DOCUMENTS

| | | |
|---|---|---|
| EP | 1 561 673 A2 | 8/2005 |
| EP | 1 607 306 | 12/2005 |
| EP | 1 650 103 A2 | 4/2006 |
| EP | 1 867 557 | 12/2007 |
| EP | 1 867 655 | 12/2007 |
| JP | 8-150914 | 6/1996 |
| JP | 2004-291853 | 10/2004 |
| JP | 2005-96725 | 4/2005 |
| JP | 2007-210497 | 8/2007 |
| KR | 10-2006-0058219 | 5/2006 |

* cited by examiner

DEVICE AND METHOD FOR CONTROLLING AN AUTOMATIC STEERING SYSTEM OF A VEHICLE, AND DEVICE AND METHOD FOR CHECKING THE ABILITY TO IMPLEMENT A PREDEFINED SETPOINT TRAVEL DIRECTION VARIABLE FOR A VEHICLE

BACKGROUND OF THE INVENTION

1. Field of the Invention

The present invention relates to a device and a method for controlling an automatic steering system of a vehicle and particularly relates to a device and a method for checking the ability to implement a predefined setpoint travel direction variable for a vehicle.

2. Description of the Related Art

Providing vehicles with an automatic vehicle control system is known. An automatic lane departure warning system or a parking assistance system is an example of such an automatic vehicle control system. To assist the driver in parking in a parking space, the parking assistance system ascertains an advantageous parking trajectory, taking into account the dimensions of the parking space and a position of the vehicle in relation to the parking space. For example, the parking trajectory is made up of a consecutive series of linear segments, circular segments, and clothoids. Depending on the dimensions and the starting positions, the circular segments may require various constant steering angle requests. There is even a high probability that the radii, and therefore the required steering angle, may vary greatly.

Figure 1:
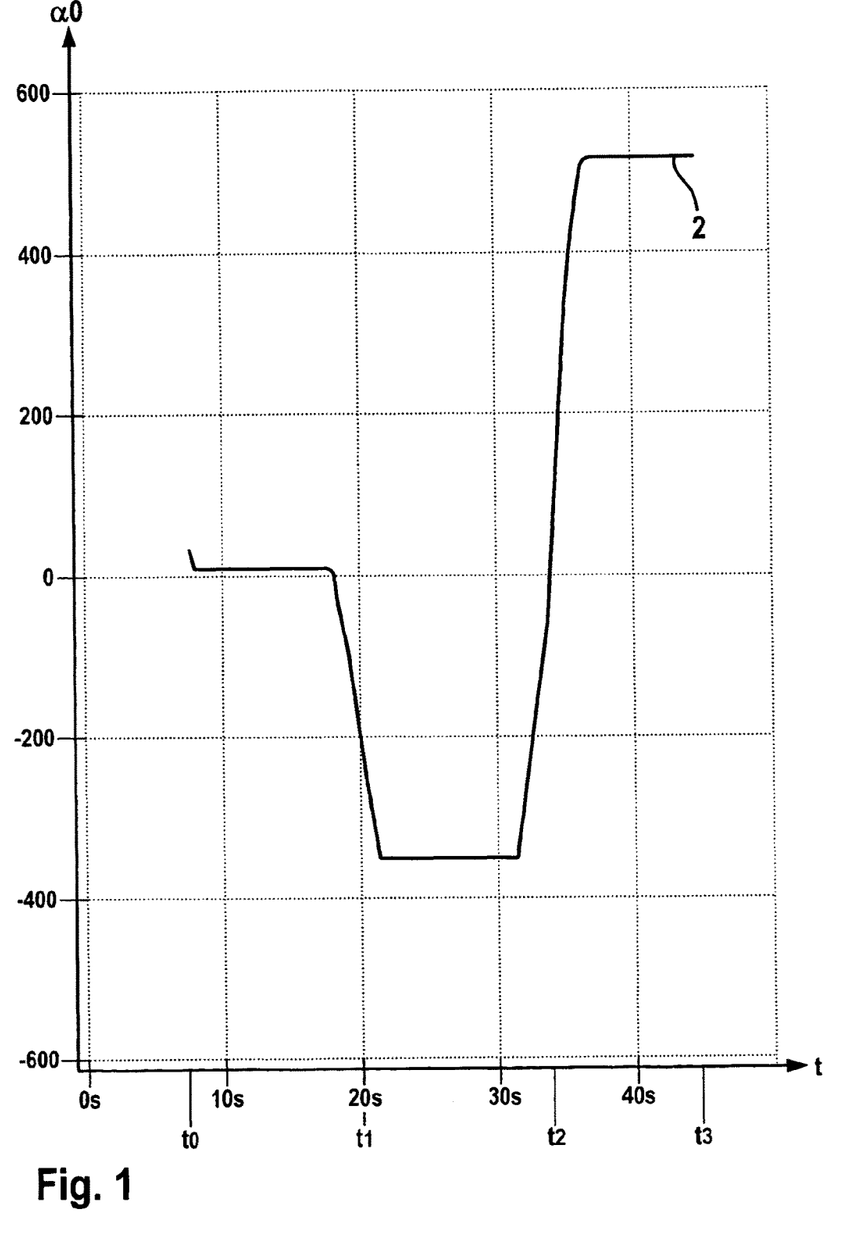
FIG. 1 shows a coordinate system for illustrating one example of a steering angle request ascertained by a parking assistance system, as a function of time.

FIG. 1 shows a coordinate system for illustrating one example of a steering angle request ascertained by a parking assistance system, as a function of time (graph 2). The abscissa of the coordinate system is time axis t. The ordinate indicates setpoint steering wheel angles $\alpha 0$, which at appropriate times must be adjusted at the steering wheel or at the steering linkage. Setpoint steering wheel angle $\alpha 0$ corresponds to a steering wheel angle request.

At a point in time t0 the parking operation is started at a setpoint steering wheel angle $\alpha 0$ of $0°$. At points in time t1 and t2, setpoint steering wheel angle $\alpha 0$ assumes other values when the steering wheel is to be greatly deflected. Thus, the planned route for the parking operation provides for two circular arcs on which setpoint steering wheel angle $\alpha 0$ is constant. The parking operation is terminated at point in time t3. If the specified advantageous steering angle request is maintained, it is assumed that at point in time t3 the vehicle is in an advantageous position in the parking space.

An ascertained advantageous parking trajectory, such as the variation over time of the steering angle request in FIG. 1, for example, may be communicated to the driver during the parking operation via steering instructions. Alternatively, the ascertained advantageous parking trajectory may be automatically implemented using an automatic steering wheel control system. The setpoint travel directions (setpoint steering angles, for example) of the advantageous parking trajectory are automatically set during the parking operation at given points in time which result from the ascertained advantageous parking trajectory. For example, the particular predefined setpoint steering wheel angle $\alpha 0$ is automatically set at points in time t0 through t3. This provides additional assistance to the driver in parking in the parking space.

A suitable automatic steering wheel control system may be implemented using an electronic steering system (electronic steering chassis (ESC)/electromechanical power-assisted steering (EPS)), for example. However, reliably maintaining the advantageous parking trajectory requires that the predefined setpoint travel directions be maintained relatively precisely. This places great demands on the electronic steering system.

Figure 2:
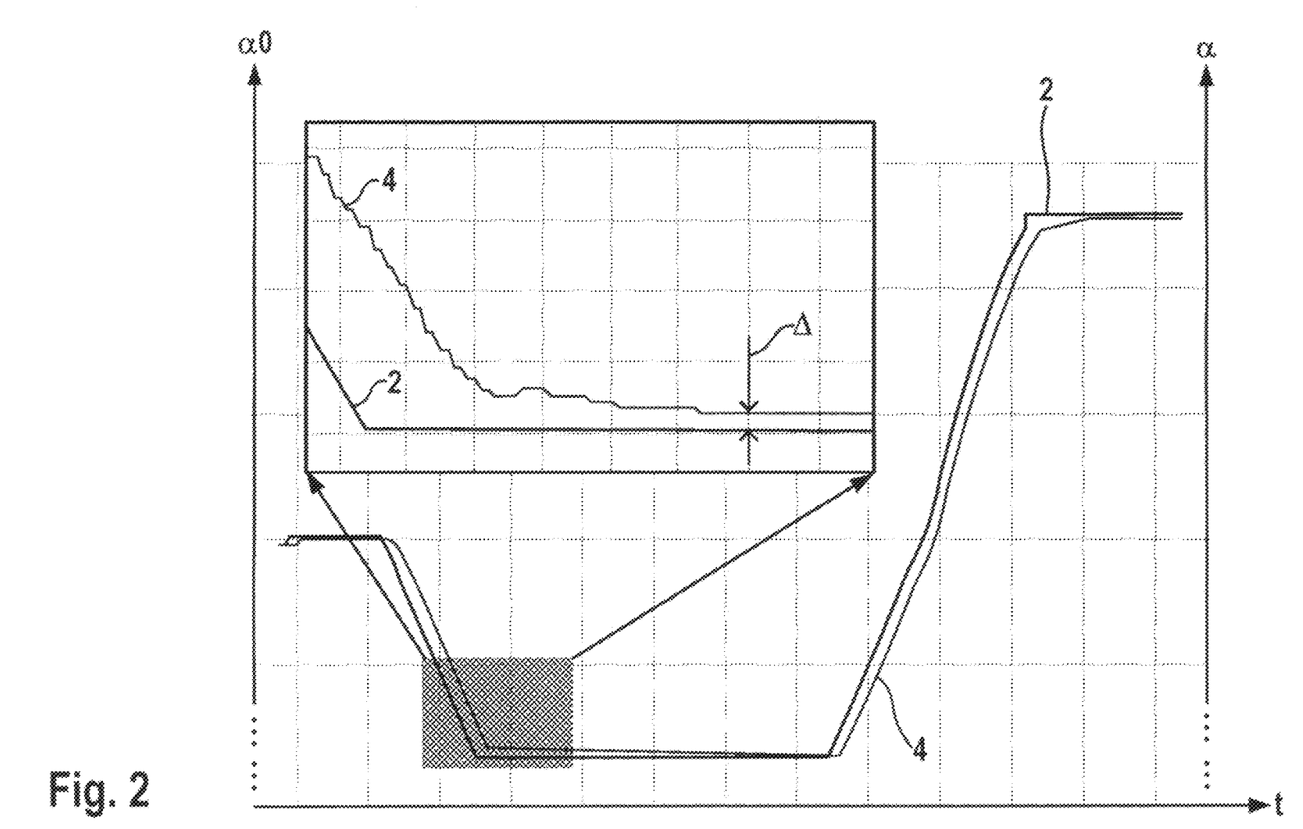
FIG. 2 shows a coordinate system for illustrating one example of imprecise maintenance of the predefined setpoint steering wheel angle of FIG. 1.

In practice, however, it is often not possible to maintain specified setpoint steering wheel angles $\alpha 0$. FIG. 2 shows a coordinate system for illustrating an example of imprecisely maintaining predefined setpoint steering wheel angles $\alpha 0$ of FIG. 1. The abscissa and the ordinate of the coordinate system, the same as for FIG. 1 above, correspond to time axis t and specified setpoint steering wheel angles $\alpha 0$, respectively. The ordinate also indicates ascertained actual steering wheel angles $\alpha$ while a vehicle having an electronic steering system executes the predefined parking trajectory. A partial detail from FIG. 2 is illustrated in enlarged scale for better understanding.

Graph 4 indicates actual steering wheel angle $\alpha$ which is actually set at the steering wheel at a point in time t via the electrical steering system. It is apparent from a comparison of graphs 2 and 4 that setpoint steering wheel angle $\alpha 0$ specified by the parking assistance system is only imprecisely maintained by the electrical steering system. For example, actual steering wheel angle $\alpha$, which is set for a setpoint steering wheel angle $\alpha 0$ of $300°$, may only be $295°$. If difference $\Delta$ of $5°$ between setpoint steering wheel angle $\alpha 0$ and actual steering wheel angle $\alpha$ is not corrected, this may result in significant deviations when the predefined parking trajectory is executed.

In addition, in particular for very tight parking spaces, parking trajectories result which have comparatively large steering angles. If it is no longer possible for the vehicle to implement these comparatively large steering angles, the parking trajectory traveled deviates significantly from the ascertained advantageous parking trajectory.

It is often possible that errors in setting the desired setpoint travel direction may no longer be correctable by an intervention by the driver. In many cases this requires premature termination of the parking operation. In addition, the departure of the vehicle from the ascertained advantageous parking trajectory may result in a collision, for example with an adjacently parked vehicle.

Published European patent application document EP 1 650 103 A2 describes a steering system for a vehicle in which a yaw rate is compared to a steering angle. The travel direction of the vehicle may then be corrected in such a way that the steering angle matches the yaw rate. However, the signal of the yaw rate must be highly filtered on account of the noise of the sensor. This results in a time delay. In addition, a reliable yaw rate is ascertainable only at comparatively high speeds. Furthermore, ascertaining the possible deviations between the yaw rate and the steering angle and then correcting the direction of travel requires a relatively large amount of time.

BRIEF SUMMARY OF THE INVENTION

The present invention provides: a device for controlling an automatic steering system of a vehicle; a device for checking the ability to implement a predefined setpoint travel direction variable for a vehicle; a method for controlling an automatic steering system of a vehicle; and a method for checking the ability to implement a predefined setpoint travel direction variable for a vehicle.

The device and the method for controlling an automatic steering system of a vehicle are based on ascertaining a difference between a required setpoint travel direction variable and an actual travel direction variable set by the automatic (electronic) steering system. The present invention is also based on the concept that the difference (offset) during or prior to carrying out a predefined travel route, such as a parking trajectory, may be compensated for by ascertaining a corrected setpoint travel direction variable before the desired setpoint travel direction variable is set. The corrected setpoint travel direction variable is selected in such a way that driving the vehicle in the direction corresponding to the desired setpoint travel direction variable is ensured with a high degree of probability. A correction factor, which is redefined in regular intervals when necessary, is preferably used.

The device and the method provide compensation for offsets which during a semi-automatic parking maneuver may be caused by the electronic steering system installed in the vehicle. The robustness of semi-automatic parking systems may thus be improved via the present invention. Independent adaptation of the system to the connected sensor system and actuator system is possible. Aging processes or other influencing factors on the automatic steering system or on the translation of the steering angle into a position of the wheels may thus be compensated for. The present invention may be implemented at low cost.

Various deviations may be compensated for using a device according to the present invention and a method according to the present invention. Thus, as the result of deviations in the internal signal processing of the electronic steering system, a predefined setpoint travel direction variable, for example a setpoint travel direction, a setpoint steering wheel angle, and/or a setpoint wheel angle, is/are maintained only imprecisely by the vehicle. Thus, it is customary that a setpoint steering wheel angle frequently may be set only imprecisely at the steering wheel. In addition, aging processes or wear processes in the automatic steering system or the chassis may result in imprecise setting of the predefined setpoint travel direction variable. Other customary sources of errors are manufacturing tolerances and external influences on, or changes to, the chassis. Thus, repeatedly driving up against a curb, which generally occurs with extended operation of a vehicle, results in mechanical misalignments of the chassis. In addition, changing the tires of the vehicle may result in deviations in the set steering angle from a predefined setpoint wheel angle. However, the customary causes of errors described in the present paragraph may be compensated for using the device according to the present invention and the corresponding method.

The term "correction factor" used herein does not stipulate that the correction factor is a multiplicative factor. By correcting the setpoint travel direction variable using the correction factor, a probable deviation of the travel direction from the setpoint travel direction variable without the correction may be prevented, even before a desired travel direction is set. Thus, a reliable execution is ensured even before the travel segment, for example the parking operation, has begun.

For example, the predefined setpoint travel direction variable is a setpoint travel direction, a setpoint steering wheel angle, and/or a setpoint wheel angle, and the actual travel direction variable is an actual travel direction, an actual steering wheel angle, and/or an actual wheel angle.

In one advantageous refinement, the evaluation device is also designed to limit the possible causes for the deviation of the at least one actual travel direction variable from the at least one predefined setpoint travel direction variable by the at least one minimum difference by comparing the actual steering wheel angle to the setpoint steering wheel angle, and by comparing the actual wheel angle to the setpoint wheel angle. If, for example, the actual steering wheel angle corresponds to the setpoint steering wheel angle, it may be ruled out that the deviation of the actual wheel angle from the setpoint wheel angle is caused by a malfunction of the automatic steering system. The cause of error may be ascertained in particular by comparing multiple actual values to multiple setpoint values. This reduces the costs for eliminating the deviation.

In another advantageous refinement, the device has a further signal input which is designed to receive a vehicle inclination ascertained by a further sensor of the vehicle and/or a coefficient of friction of a traveled roadway ascertained by a further sensor of the vehicle, the control unit being designed to read out from the memory device, from a predefined set of correction factors, a correction factor which corresponds to the vehicle inclination and/or the coefficient of friction of the traveled roadway. This allows the corrected setpoint travel direction variable, and thus the corresponding actual travel direction variable, to be adjusted to weather conditions and environmental conditions.

The device and the method for checking the ability to implement a predefined setpoint travel direction variable for a vehicle are based on the concept of comparing the steering forces on the steering train and/or the adjustment forces on the wheels, corresponding to the set maximum steering angle and/or the maximum wheel angle during travel, to comparative values. If the applied force does not correspond to the comparative values for the maximum steering wheel angle and/or the maximum wheel angle, it is advantageous to redetermine the maximum possible steering wheel angle and/or the maximum possible wheel angle above a certain deviation from at least one comparative value.

In one example embodiment, conclusions may be drawn concerning changes in the maximum possible steering angle range by evaluating the instantaneous applied force of the electronic steering system for an active parking guidance (APG) system or the force of the power steering for a passive parking guidance (PPG) system.

In one advantageous example embodiment, the device and the method may also be used to automatically set a steering wheel angle in vehicles lacking an automatic steering system. For example, a parking trajectory computed by a parking assistance system is communicated to the driver via an optical display or an acoustic announcement. During the parking cycle the force exerted by the driver on the steering wheel, i.e., the force which is applied to move the wheels, is measured. If the measured forces vary too greatly from a threshold value calibrated beforehand, it may be concluded that the full steering angle is no longer being reliably implemented by the vehicle. Appropriate information may then be sent to the parking assistance system. The parking assistance system is preferably designed in such a way that the maximum steering angle may be downwardly corrected after such a notification is received. In this way, a steering angle which is not technically achievable may be prevented from being specified for the driver by the parking assistance system. For example, the output value for the maximum steering angle is predefined according to the manufacturer's recommendation.

In one refinement, at least one output value of a maximum steering wheel angle which may be implemented and/or of a maximum wheel angle of the vehicle which may be implemented is stored on the device, and if the at least one adjustment force differs from the at least one comparative value by the at least one minimum difference, after receiving the comparative signal the evaluation device is also designed to redefine the maximum steering wheel angle which may be implemented and/or the maximum wheel angle of the vehicle which may be implemented, and the information signal which is output at the automatic vehicle control system includes information concerning the redefined maximum steering wheel angle which may be implemented and/or the redefined maximum wheel angle which may be implemented. Thus, current information concerning the maximum steering wheel angle which may be implemented and/or the maximum wheel angle for the vehicle which may be implemented is always present.

The device may also be designed in particular to limit the possible causes for the deviation of the at least one adjustment force from the at least one comparative value by the at least one minimum difference by comparing multiple adjustment forces to multiple comparative values. In particular, the device is able to identify the probable cause by comparing multiple adjustment forces to multiple comparative values, which facilitates elimination of the cause.

In another advantageous refinement, the device has a third signal input which is designed to receive a vehicle inclination ascertained by a further sensor of the vehicle and/or a coefficient of friction of a traveled roadway ascertained by a further sensor of the vehicle, the comparator being designed to ascertain from a predefined set of comparative values at least one comparative value corresponding to the vehicle inclination and/or to the coefficient of friction of the traveled roadway. The device thus takes environmental and/or weather conditions into account.

The advantages of the devices described in the preceding paragraphs also apply to the corresponding methods.

DETAILED DESCRIPTION OF THE INVENTION

Figure 3:
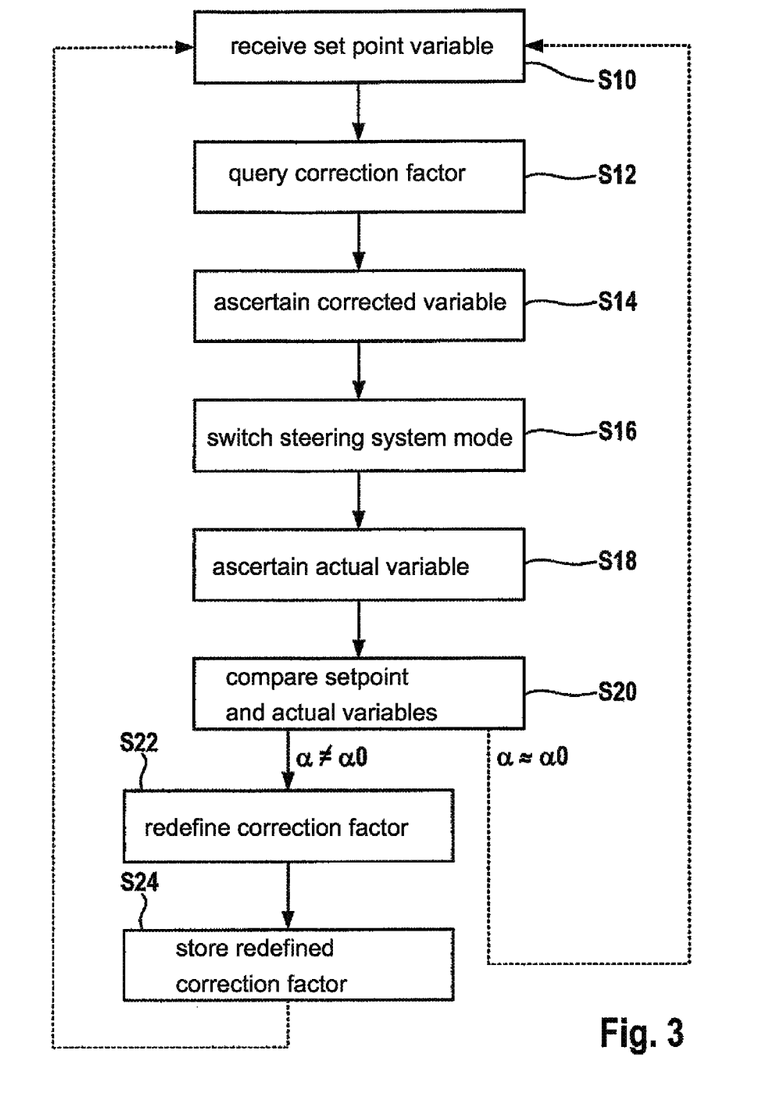
FIG. 3 shows a flow chart for illustrating a first example embodiment of the method for controlling an automatic steering system of a vehicle.

FIG. 3 shows a flow chart for illustrating a first specific embodiment of the method for controlling an automatic steering system of a vehicle.

At the start of the method a predefined setpoint travel direction variable is received by an automatic vehicle control system (step S10). The setpoint travel direction variable may be, for example, a setpoint travel direction, a setpoint steering wheel angle, and/or a wheel angle which is advantageous at a given point in time. Instead of a single variable, a sequence of setpoint travel directions, for example a predefined parking trajectory, may be received. The automatic vehicle control system may be designed in particular as a parking assistance system and/or as an automatic lane departure warning system. However, it is expressly pointed out that the method described herein may be used for any automatic vehicle control system which is designed for determining a setpoint travel direction variable during travel of the vehicle. For example, the automatic vehicle control system may also be a traffic control system external to the vehicle.

A stored correction factor is queried in a subsequent step S12. The correction factor is preferably stored on a memory device in the vehicle. For example, before the vehicle begins operation the manufacturer stores an output value for the correction factor on the memory device. As described below, the correction factor is continuously correctable during operation of the vehicle, and is adaptable to weather-, environment-, and vehicle-related situations.

A corrected setpoint travel direction variable is ascertained (step S14) on the basis of the correction factor and the predefined setpoint travel direction variable. For example, the correction factor is multiplied by the predefined setpoint travel direction variable, and/or a constant numerical value of the correction factor is added to the predefined setpoint travel direction variable. The term "correction factor" used herein does not stipulate that the correction factor is a multiplicative factor.

In a step S16 the automatic steering system is switched to a mode for maintaining the corrected setpoint travel direction variable. The automatic steering system is then controlled in such a way that maintenance of the setpoint travel direction variable specified by the automatic vehicle control system may be expected. Thus, the corrected setpoint travel direction variable is the travel direction variable for which the vehicle, for example due to aging of and/or damage to some of its components, travels not in the direction corresponding to the corrected setpoint travel direction variable, but, rather, in a direction corresponding to the setpoint travel direction variable specified by the automatic vehicle control system. A more detailed example for better understanding of the corrected setpoint travel direction variable is described below.

An actual travel direction variable of the vehicle is ascertained during the time interval in which the vehicle is to drive into according to the predefined setpoint travel direction variable (step S18). This is preferably carried out using at least one sensor of the vehicle. The at least one sensor of the vehicle may preferably be a steering wheel angle sensor and/or a wheel angle sensor. Depending on its function, the at least one sensor is preferably situated close to the steering wheel and/or at least one wheel of the vehicle. The at least one ascertained actual travel direction variable is, for example, an actual steering wheel angle actually present at the steering wheel and/or a wheel angle instantaneously present at a wheel of the vehicle. Likewise, the at least one sensor may be a global positioning system (GPS) having suitable resolution for precisely ascertaining the instantaneous actual travel direction of the vehicle.

The at least one ascertained actual travel direction variable is compared to the predefined setpoint travel direction variable in a subsequent step S20. If the actual travel direction variable deviates from the predefined setpoint travel direction variable ($\alpha \neq \alpha 0$) by at least a minimum difference, in a further step S22 the correction factor is redefined on the basis of the comparison. For example, the setpoint travel direction variable is a setpoint steering wheel angle of 300°. However, the actual steering wheel angle ascertained as the actual travel direction variable is only 295°. In this case a correction factor of approximately 1.017 may be computed by dividing the setpoint steering wheel angle by the actual steering wheel angle.

The redefined correction factor is stored in a following step S24. As soon as the automatic vehicle control system receives a further setpoint travel direction variable, the associated corrected setpoint vehicle direction variable may be ascertained using the redefined correction factor. Thus, at an advantageously early point in time the automatic steering system is already switched to the mode in which, according to new information concerning the current weather, environmental, and/or vehicle situation, it may thus be expected that the vehicle is traveling in the direction which corresponds to the setpoint travel direction variable specified by the automatic vehicle control system.

The setpoint travel direction variable received by the automatic vehicle control system is, for example, a setpoint steering wheel angle of 150°. A corrected setpoint steering wheel angle may be computed for compensation in advance for a probable deviation between the setpoint steering wheel angle and an actual steering wheel angle when the automatic steering system is switched to a mode for maintaining the predefined setpoint steering wheel angle of 150°. For this purpose, the predefined setpoint steering wheel angle may be multiplied by the redefined correction factor of approximately 1.017. For example, a corrected setpoint steering wheel angle of 152° is computed. The automatic steering system is then switched to a mode for maintaining the corrected setpoint steering wheel angle of 152°. Since the corrected setpoint steering wheel angle may be ascertained relatively quickly, the possible resulting delay in controlling the automatic steering system is negligible. Thus, after receiving the predefined setpoint steering wheel angle of 150°, the automatic steering system is directly controlled in such a way that the actual steering wheel angle is in fact 150°.

If it is determined in step S20 that the actual travel direction variable corresponds to the predefined setpoint travel direction variable ($\alpha \approx \alpha 0$), redetermining the correction factor may be dispensed with. Of course, in this case as well a value may be computed for the correction factor which, however, approximately corresponds to the value previously used for the correction factor. Thus, by comparing the ascertained actual travel direction variable to the predefined setpoint travel direction variable and/or to the corrected setpoint travel direction variable in step S20, a computation step may also be understood as the continuous determination of an instantaneous value for the correction factor. However, the correction factor has not been redefined for an actual travel direction variable corresponding to the predefined setpoint travel direction variable, since the instantaneous determined value of the correction factor corresponds to the previous value of the correction factor.

The method described herein allows the components which act in cooperation with the steering wheel mechanical system to be continuously adapted to the current state of the individual components. The components acting in cooperation with the steering wheel mechanical system may include, for example, an electrical steering system (electronic steering chassis (ESC)), a chassis, and/or the tires of the vehicle. At this point it is expressly pointed out that the method described herein is able to compensate not only for aging of and/or damage to the electrical steering system, but also for malfunction of the chassis, anomalous behavior in the translation of the steering wheel angle into a wheel angle, and/or different characteristics of tires. This significantly improves the system robustness of the components acting in cooperation with the steering wheel mechanical system. The correction factor may be constantly updated by being continuously redetermined (tracking). A high level of effort for calibration is not necessary.

In one refinement, multiple actual travel direction variables may also be compared to the predefined setpoint travel direction variable. For example, an actual steering angle is compared to the setpoint steering angle, and an actual wheel angle is compared to a setpoint wheel angle. The setpoint steering angle and the setpoint wheel angle may be provided by the automatic vehicle control system and/or ascertained from a predefined setpoint travel direction variable. By comparing multiple actual values to multiple setpoint values, the possible causes for the deviation of the at least one actual travel direction variable from the at least one predefined setpoint travel direction variable by the at least one minimum difference may be limited. In particular, the particular functionally impaired component responsible for the failure of the vehicle to maintain a predefined setpoint travel direction variable may be identified. An appropriate message may then be sent to the driver. Thus, the present invention allows quicker and more cost-effective elimination of malfunctions of the components acting in cooperation with the steering wheel mechanical system.

In another refinement of the method, the comparative value may be ascertained as a function of a vehicle inclination (roadway inclination) and/or a coefficient of friction of the traveled roadway. Many vehicles are customarily equipped with at least one sensor which already allows the roadway inclination, the vehicle inclination, and/or the coefficient of friction of the traveled roadway to be ascertained. For example, the coefficient of friction of the traveled roadway may be determined using a sensor used in the ESP system or ACC system.

Thus, the vehicle inclination (roadway inclination) and/or the coefficient of friction of the traveled roadway may be queried before the corrected setpoint travel direction variable is ascertained. The correction factor which best corresponds to the roadway inclination, the vehicle inclination, and/or the coefficient of friction of the traveled roadway is then read out from a set of multiple correction factors from a memory device. The corrected setpoint travel direction variable which is determined in this way is thus adapted particularly well to the current weather conditions and/or environmental conditions. Furthermore, a redetermined correction factor together with at least one current ascertained value for the vehicle inclination (roadway inclination) and/or the coefficient of friction of the traveled roadway may be stored.

The refinement of the method described herein thus allows learning with regard to the aging and functional state of the vehicle, the weather conditions, and/or the environmental conditions via an optimal control of the direction of the vehicle. Deviations which might otherwise result during a change in the direction of travel on an iced roadway may thus be reduced or compensated for via the learning.

Figure 4:
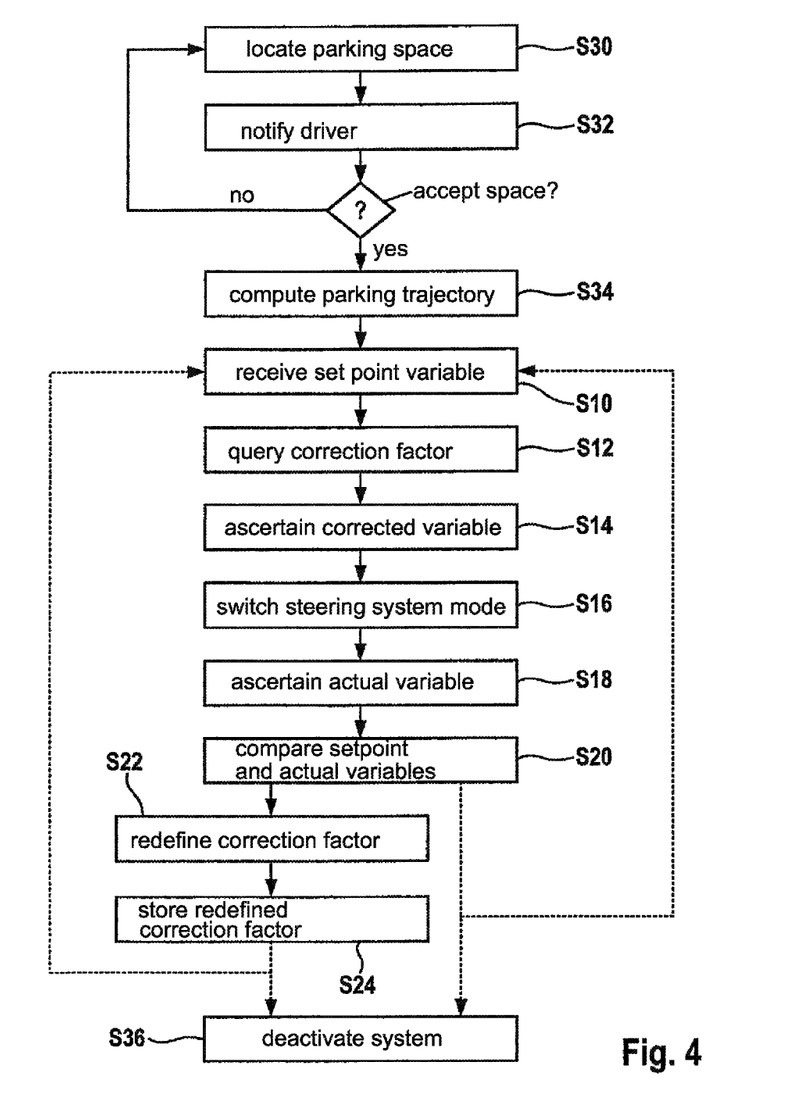
FIG. 4 shows a flow chart for illustrating a second example embodiment of the method for controlling an automatic steering system of a vehicle.

FIG. 4 shows a flow chart for illustrating a second example embodiment of the method for controlling an automatic steering system of a vehicle.

A parking space is located during a first step S30 of the method. In the parking space location, a parking assistance system of the vehicle, for example a semi-automatic parking assistance system (PSC), is activated to a mode in which the parking assistance system searches for a parking space while the vehicle is traveling. Since methods for finding a parking space, for example using an ultrasonic sensor integrated into the bumper, are known from the related art, a more detailed description is not provided here. During travel past a potential parking space, the sensor of the parking assistance system measures the parking space and ascertains the position of the vehicle in relation to the parking space.

If the parking space corresponds to the desired requirements, the driver is notified of the found parking space via an output device, for example a display (step 32).

The driver then has the option to accept the found parking space via an appropriate input. If he does not do this, steps S30 and S32 are repeated.

If the driver indicates his acceptance of the found parking space, the parking assistance system computes an advantageous parking trajectory in a further step S34. The advantageous parking trajectory may be ascertained as described above. The data for the ascertained parking trajectory, in particular the at least one setpoint travel direction variable, are then output.

The method described with reference to FIG. 3 may then be implemented. A setpoint steering wheel angle is received as the at least one setpoint travel direction variable in step S10. Using the correction factor read out in step S12, at least one corrected setpoint steering wheel angle is then computed as the corrected setpoint travel direction variable (step S14).

In a step S16 the corrected setpoint steering angle may be output as a steering angle request to an automatic steering system. In this case the automatic steering system is designed in such a way that, after receiving the corrected setpoint travel direction variable, it adjusts the steering wheel of the vehicle in such a way that the at least one predefined setpoint travel direction variable is maintained as precisely as possible during the predefined time intervals.

As soon as the stable (constant) state of the steering angle request has been set, the real-time actual steering wheel angle may be ascertained (step S18). The actual steering wheel angle may be queried via the vehicle bus (CAN), for example. The actual offset of the actual steering wheel angle from the predefined setpoint steering wheel angle and/or from the corrected setpoint steering wheel angle may then be ascertained by comparing and/or by forming a difference between the at least two variables (step S20). In one refinement of the method, the offset resulting from the steering wheel mechanical system may be tracked for various steering wheel angle requests (setpoint steering wheel angle) that are made.

If it is determined in step S20 that the actual steering wheel angle differs significantly from the predefined setpoint steering wheel angle and/or the corrected setpoint steering wheel angle, the correction factor is redefined (step S22) and is stored for a subsequent correction of the setpoint steering wheel angle specified by the parking assistance system (step S24). Since steps S22 and S24 have been described in detail above, a more detailed description is not provided here.

Steps S10 through S20 are repeated until the vehicle is in the parking space. The method is then terminated by deactivating the parking assistance system (step S36).

Figure 5:
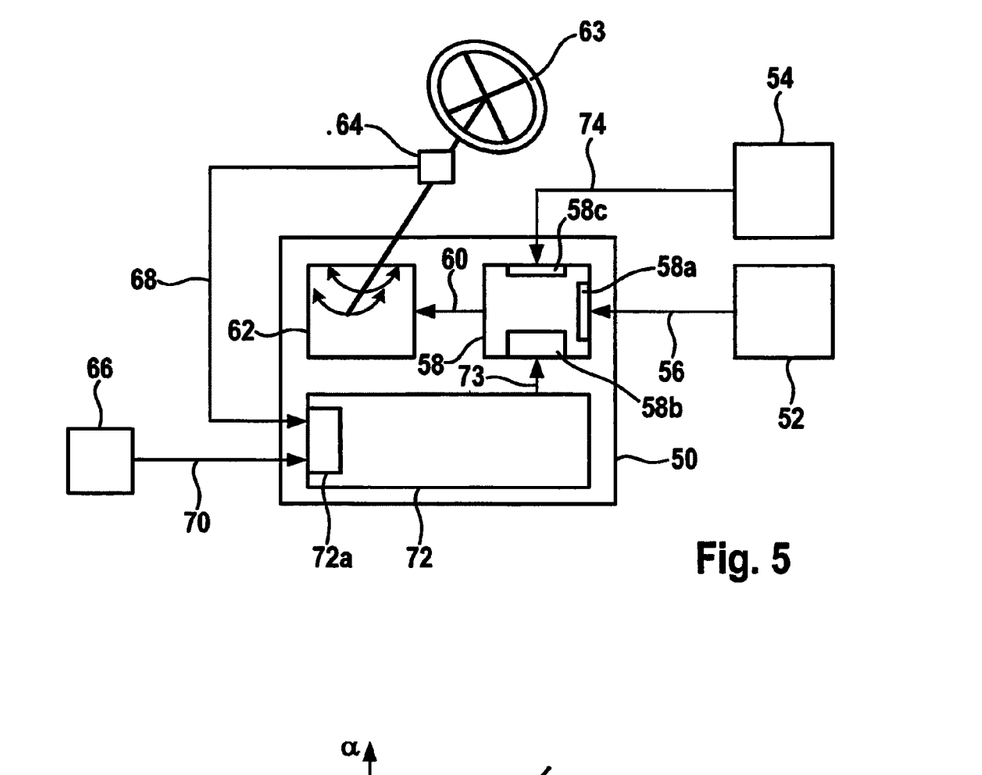
FIG. 5 shows a schematic illustration of the device for controlling an automatic steering system of a vehicle.

FIG. 5 shows a schematic illustration of the device for controlling an automatic steering system of a vehicle.

A vehicle (not illustrated) having device 50 for controlling an automatic steering system of the vehicle is also equipped with at least one automatic vehicle control system 52 and 54. For example, the vehicle has a first automatic vehicle control system 52, which as a parking assistance system is designed to provide information concerning an advantageous parking trajectory to device 50. First automatic vehicle control system 52 specifies at least one setpoint travel direction variable of device 50 via an output signal 56. The at least one setpoint travel direction variable of output signal 56 is a setpoint travel direction, a setpoint steering wheel angle, and/or a setpoint wheel angle, for example.

Device 50 has a first signal input 58a for receiving the predefined setpoint travel direction variable. For example, first signal input 58a is a subunit of a control unit 58 of device 50. Control unit 58 is designed, for example, to control an automatic steering system 62 of the vehicle via a control signal 60 in such a way that while the vehicle is traveling, steering wheel 63 hardly needs to be operated by the driver. Control unit 58 preferably takes over complete control of the instantaneous direction of travel of the vehicle. In this case a steering wheel intervention by the driver is not necessary.

Automatic steering system 62 may be designed as an electrical steering system of the vehicle. Automatic steering system 62 may be a subunit of device 50. Device 50 may also be situated on the vehicle separate from automatic steering system 62, and control signal 60 may be relayed to automatic steering system 62 via the vehicle bus.

However, automatic steering system 62 may also be designed in such a way that it merely assists in the operation of steering wheel 63 by the driver. For example, automatic steering system 62 exerts a force on steering wheel 63 which simplifies an advantageous operation of steering wheel 63 by the driver. The force exerted on steering wheel 63 by automatic steering system 62 acts, for example, in the direction of rotation in which the driver is to turn steering wheel 63. However, if the driver turns steering wheel 63 in the direction opposite to the advantageous direction of rotation, he is made aware of his disadvantageous steering wheel operation by virtue of the comparatively great force with which he must counteract automatic steering system 62.

Control unit 58 is connected to a memory device 58b on which at least one correction factor which may be read out is stored. Memory device 58b may be designed as a subunit of control unit 58 or as a unit which is separate from control unit 58. Reading out a suitable correction factor is described in greater detail below.

Control unit 58 is designed to ascertain, after a setpoint travel direction variable is received, a corrected setpoint travel direction variable based on the correction factor and the predefined setpoint travel direction variable, and to switch automatic steering system 62 via control signal 60 to a mode for maintaining the corrected setpoint travel direction variable. The switching of automatic steering system 62 may also be understood to mean activation. Since the purpose of the corrected setpoint travel direction variable has been described in detail above, a more detailed description is not repeated here.

Automatic steering system 62 adjusts steering wheel 63 after receiving control signal 60. The adjustment of steering wheel 63 by automatic steering system 62 is detectable via at least one sensor 64 and 66 of the vehicle. As a steering wheel angle sensor, for example, sensor 64 is designed to ascertain the instantaneous position of steering wheel 63. A first sensor signal 68 containing an actual steering wheel angle ascertained by sensor 64 is then provided to device 50.

The adjustment of steering wheel 63 by steering wheel mechanical system 62 causes a change in the instantaneous position of the wheels. The position of at least one wheel (not illustrated) is ascertainable via sensor 66 designed as a wheel angle sensor, and may be provided to device 50 via a second sensor signal 70 containing an actual wheel angle.

Device 50 has a second signal input 72a for receiving sensor signals 68 and 70 output by sensors 64 and 66, respectively. Second signal input 72a is connected to an evaluation device 72 for evaluating the actual steering wheel angle and/or the actual wheel angle.

Evaluation device 72 is designed to compare the at least one actual travel direction variable ascertained by a sensor 64 and 66 of the vehicle to the at least one predefined setpoint travel direction variable. In the illustrated example, evaluation device 72 compares the actual steering wheel angle to the provided setpoint steering wheel angle, and compares the actual wheel angle to the provided setpoint wheel angle. The signal for providing the setpoint steering wheel angle and the setpoint wheel angle to evaluation device 72 is not illustrated in FIG. 5 for the sake of clarity.

A comparison of the at least one actual travel direction variable to the at least one predefined setpoint travel direction variable may also be understood to mean the computation of a numerical value which reflects the comparison. Examples of computation of this numerical value have been provided above. Another example of an advantageous ascertainment of the numerical value is explained in the description of FIG. 6.

Thus, in a situation in which the actual travel direction variable deviates from the predefined setpoint travel direction variable by at least a minimum difference, evaluation device 72 is designed to compute a numerical value which reflects the deviation. Of course, in one particular specific embodiment of device 50 this numerical value may be computed only after an exceedance of the minimum difference between the actual travel direction variable and the predefined setpoint travel direction variable is determined. A correction factor which corresponds to the computed numerical value is then redefined, and via a stored signal 73 is output to memory device 58. The correction factor is stored on memory device 58b.

The redefined correction factor may be used in a subsequent ascertainment of a corrected setpoint travel direction variable. It is thus possible to counteract deviations in automatic steering system 62 when steering wheel 63 is adjusted, which result, for example, from aging of automatic steering system 62 or of other steering wheel components. This ensures a preventive correction for the automatic adjustment of steering wheel 63. In addition, a faulty translation of the actual steering wheel angle into the actual wheel angle may be compensated for by comparing the actual wheel angle to the setpoint wheel angle. This also ensures that aging processes and/or mechanical misalignments of the chassis are counteracted.

In one example embodiment, control unit 58 is connected to a third signal input 58c for receiving a data signal 74 containing an instantaneous vehicle inclination (roadway inclination) and/or a coefficient of friction of a roadway traveled on at that moment. Data signal 74 containing the instantaneous vehicle inclination and/or the coefficient of friction of the roadway traveled on at that moment is provided by second automatic vehicle control system 54, for example. Such a second automatic vehicle control system 54, which is designed to ascertain the instantaneous vehicle inclination and/or the coefficient of friction of the roadway traveled on at that moment, is an ESP system or an ACC system, for example. Of course, second automatic vehicle control system 54 may also be designed integrated with first automatic vehicle control system 52.

Control unit 58 or evaluation device 72 may be designed in such a way that it stores on memory device 58b a correction value ascertained by evaluation device 72, together with the associated value of the vehicle inclination and/or of the coefficient of friction of the roadway traveled on at that moment. At a later point in time when the corrected setpoint travel direction variable is ascertained based on a received data signal 74, the correction factor which is (re)defined for a corresponding value of the vehicle inclination and/or of the coefficient of friction of the roadway traveled on at that moment is queried by memory device 58b.

In the preceding paragraphs the described device 50 is designed to receive signals from a parking assistance system, and to evaluate same for adjusting steering wheel 63. It is understood that the present invention is not limited to this application example. Device 50 may also be designed to operate steering wheel 63 in another automatic driving mode of the vehicle corresponding to the specifications of another automatic vehicle control system 52, for example an automatic lane departure warning system.

Figure 6:
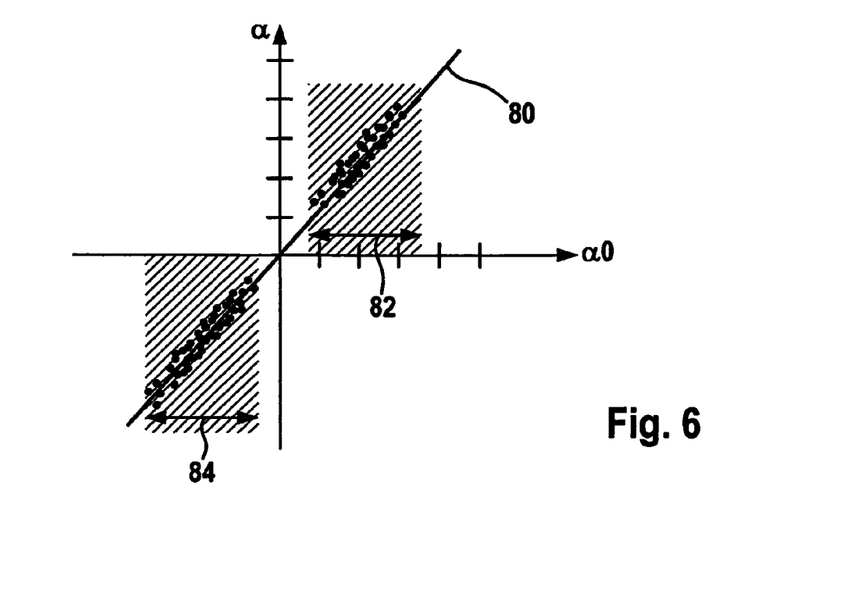
FIG. 6 shows a coordinate system for illustrating one refinement of the device of FIG. 5.

FIG. 6 shows a coordinate system for illustrating one refinement of the device of FIG. 5. The abscissa of the coordinate system indicates setpoint steering wheel angles $\alpha 0$, which are specified for one or multiple parking operations by an automatic vehicle control system which functions as a parking assistance system. The abscissa of the coordinate system corresponds to actual steering wheel angles $\alpha$ ascertained for predefined setpoint steering wheel angles $\alpha 0$. For example, actual steering wheel angles $\alpha$ are output by a steering wheel angle sensor to the vehicle bus, and are read out from the vehicle bus by an evaluation device.

The points entered into the coordinate system correspond to the value pairs of setpoint steering wheel angles $\alpha 0$ and actual steering wheel angles $\alpha$. These points relate to various parameterized steering wheel angular ranges 82 and 84. For example, for steering wheel angular ranges 82 and 84 a distinction may be made between forward travel and reverse travel of the vehicle.

A regression line 80 or line of best fit may be ascertained based on the points entered into the coordinate system. The slope of regression line 80 is ascertainable by the evaluation device and then storable as a correction factor on the memory device.

Figure 7:
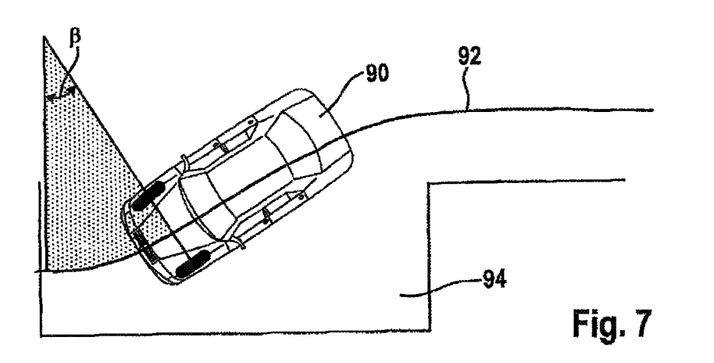
FIG. 7 show a schematic illustration of a vehicle being parked in a parking space.

FIG. 7 shows a schematic illustration of a vehicle parking in a parking space.

Schematically represented vehicle 90 is guided into a parking space 94 via an automatic execution of a parking trajectory 92 which is ascertained by a parking assistance system (not illustrated). Parking trajectory 92 is preferably automatically executed with the aid of an automatic steering wheel control system such as an electrical steering system, for example. At any point in time in the parking operation the position of vehicle 90 relative to parking space 94 is ascertainable via an odometric method, for example using a steering wheel angle sensor or a wheel pulse counter.

For a precise execution of specified parking trajectory 92 it is important that the maximum steering wheel angle which may be implemented and/or the maximum wheel angle of vehicle 90 which may be implemented is equal to or greater than the largest steering wheel angle $\beta$ and/or the largest wheel angle of parking trajectory 92. Parking trajectory 92, in particular for a parking trajectory in a tight parking space 94, may have comparatively large steering wheel angles (full deflection) and/or wheel angles.

The maximum steering wheel angle which may be implemented and/or the maximum wheel angle of vehicle 90 which may be implemented are generally calibrated once by the manufacturer. However, during operation of vehicle 90 changes may occur on vehicle 90, for example due to vehicle aging or damage to the chassis, which result in a significant reduction in the maximum steering wheel angle which may be implemented and/or the maximum wheel angle which may be implemented. This problem may be eliminated using the method described below with reference to FIG. 8.

Figure 8:
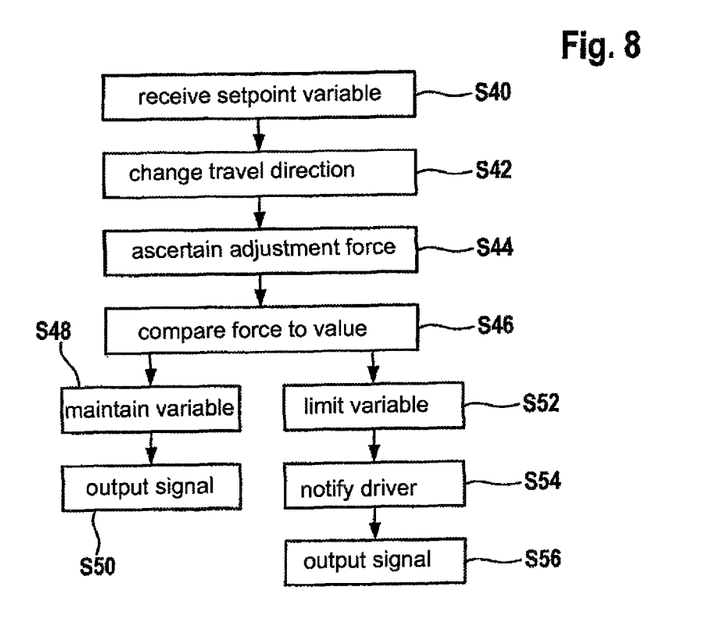
FIG. 8 shows a flow chart for illustrating an example embodiment of the method for checking the ability to implement a predefined setpoint travel direction variable for a vehicle.

FIG. 8 shows a flow chart for illustrating one example embodiment of the method for checking the ability to implement a predefined setpoint travel direction variable for a vehicle.

A setpoint travel direction variable specified by a driver and/or by an automatic vehicle control system is received in a first step S40 of the method. For example, a parking assistance system specifies the setpoint travel direction variable via a parking trajectory which is provided to an automatic steering system. The setpoint travel direction variable which is specified in this way may then be used for carrying out the method described herein. In this case step S40 is carried out, for example, after method steps S30 through S34 described above.

At this point it is expressly pointed out that the described method is not limited to parking operations. For example, another automatic vehicle control system, such as an automatic lane departure warning system or a traffic control system external to the vehicle, may provide the predefined setpoint travel direction variable. In addition, the driver may specify the setpoint travel direction variable, for example by turning the steering wheel. The vehicle may also be in an operating mode in which the direction of travel is specified solely by the driver. The setpoint travel direction variable may be a setpoint travel direction, a setpoint steering wheel angle, and/or a setpoint wheel angle.

The instantaneous direction of travel of the vehicle is then changed according to the predefined setpoint travel direction variable (step S42). During this operation, at least one adjustment force which is applied for adjusting the steering wheel and/or a wheel of the vehicle when the instantaneous direction of travel changes is ascertained (step S44). The at least one adjustment force is ascertained by at least one sensor of the vehicle.

The at least one adjustment force is then compared to at least one predefined comparative value in step S46. If it is determined in step S46 that the at least one provided adjustment force corresponds to the at least one predefined comparative value, it is concluded that the predefined setpoint travel direction variable is maintainable for the vehicle (step S48). A corresponding signal containing this information may then be output to at least one device of the vehicle, for example to the automatic vehicle control system (step S50). An appropriate notification of the driver is also possible.

An adjustment force which corresponds to a predefined comparative value may also be understood to mean an adjustment force which is less than a predefined threshold value or within a predefined value range.

If the at least one adjustment force deviates from the at least one comparative value by at least a minimum difference, which in this specific embodiment defines a standard for a properly operating automatic steering system, it is concluded that the predefined setpoint travel direction variable is maintainable for the vehicle only to a limited extent (step S52). An appropriate message may be sent to the driver immediately (step S54). This occurs via an announcement or a display, for example. The driver then has the option of finding a repair facility and having the damage to the vehicle which has caused the reduction in the maximum steering wheel angle which may be implemented and/or the maximum wheel angle which may be implemented eliminated. The possible causes for the deviation of the at least one adjustment force from the at least one comparative value by the at least one minimum difference may be limited by comparing multiple adjustment forces to multiple comparative values. In particular, by comparing multiple adjustment forces to multiple comparative values it is possible to determine the cause of the inadequate ability to implement the predefined setpoint travel direction variable. It is thus possible to identify a malfunction due to changes external to the system, for example track width misalignments resulting from collisions with the curb, and/or aging of the electrical steering system. This reduces the cost of repairs.

This inadequate ability to implement the predefined setpoint travel direction variable causes a reduction in the maximum steering wheel angle which may be implemented and/or the maximum wheel angle which may be implemented. However, using the present method, this reduction may often be eliminated in a simple and cost-effective manner.

As an alternative or addition to step S54, an information signal may be output to the automatic vehicle control system in a step S56. The information signal contains, for example, the information that the predefined setpoint travel direction variable, and thus a maximum steering wheel angle which previously could be implemented and/or a maximum wheel angle which previously could be implemented, is/are no longer maintainable for the vehicle. In one preferred specific embodiment of the method, the automatic vehicle control system is designed in such a way that only fairly small steering wheel angles and/or wheel angles of the electrical steering system are specified after receiving the information signal. For example, after receiving the information signal, the parking assistance system computes only parking trajectories having fairly small steering wheel angles and/or wheel angles.

The method thus offers the advantage that the planned route which is implemented by the parking assistance system and which plans the optimum path of the vehicle into the parking space takes into account only scenarios which are technically possible. The robustness of the system is significantly improved with the aid of this measure.

In one refinement of the method, if it is determined that the predefined setpoint travel direction variable is maintainable for the vehicle only to a limited extent, redetermining the maximum steering wheel angle which may be implemented and/or the maximum wheel angle of the vehicle which may be implemented is initiated in step S52. The maximum steering wheel angle which may be implemented and/or the maximum wheel angle of the vehicle which may be implemented, taking into account the at least one adjustment force, is/are preferably redefined in such a way that a reliable implementation of the maximum steering wheel angle which may be implemented and/or of the maximum wheel angle which may be implemented by the vehicle is ensured. In particular, the maximum steering wheel angle which may be implemented and/or the maximum wheel angle which may be implemented may then be communicated to the automatic vehicle control system via the information signal.

For sloping roadway surfaces it may be necessary to apply a greater force for the full steering angle than is the case on a perfectly flat surface. In the present method, the vehicle inclination (roadway inclination) may be taken into account when the ascertained forces are compared to the at least one threshold value. The vehicle inclination (roadway inclination) may, for example, be determined at a standstill before the vehicle backs into the parking space in a reverse motion. Thus, the vehicle inclination is known before the full steering angle is implemented.

The coefficient of friction of the traveled roadway may also influence the adjustment force. Options for advantageously determining the vehicle inclination (roadway inclination) and/or the coefficient of friction of the traveled roadway, using sensors which are customarily already present on the vehicle, are described above.

In another refinement, for a value range of the vehicle inclination (roadway inclination) and/or of the coefficient of friction of the traveled roadway, at least one comparative value for a device for carrying out the method described herein is stored on a memory device by the manufacturer. This allows the ability to implement the predefined setpoint travel direction variable to be reliably checked, taking into account the weather conditions and/or environmental conditions.

Figure 9:
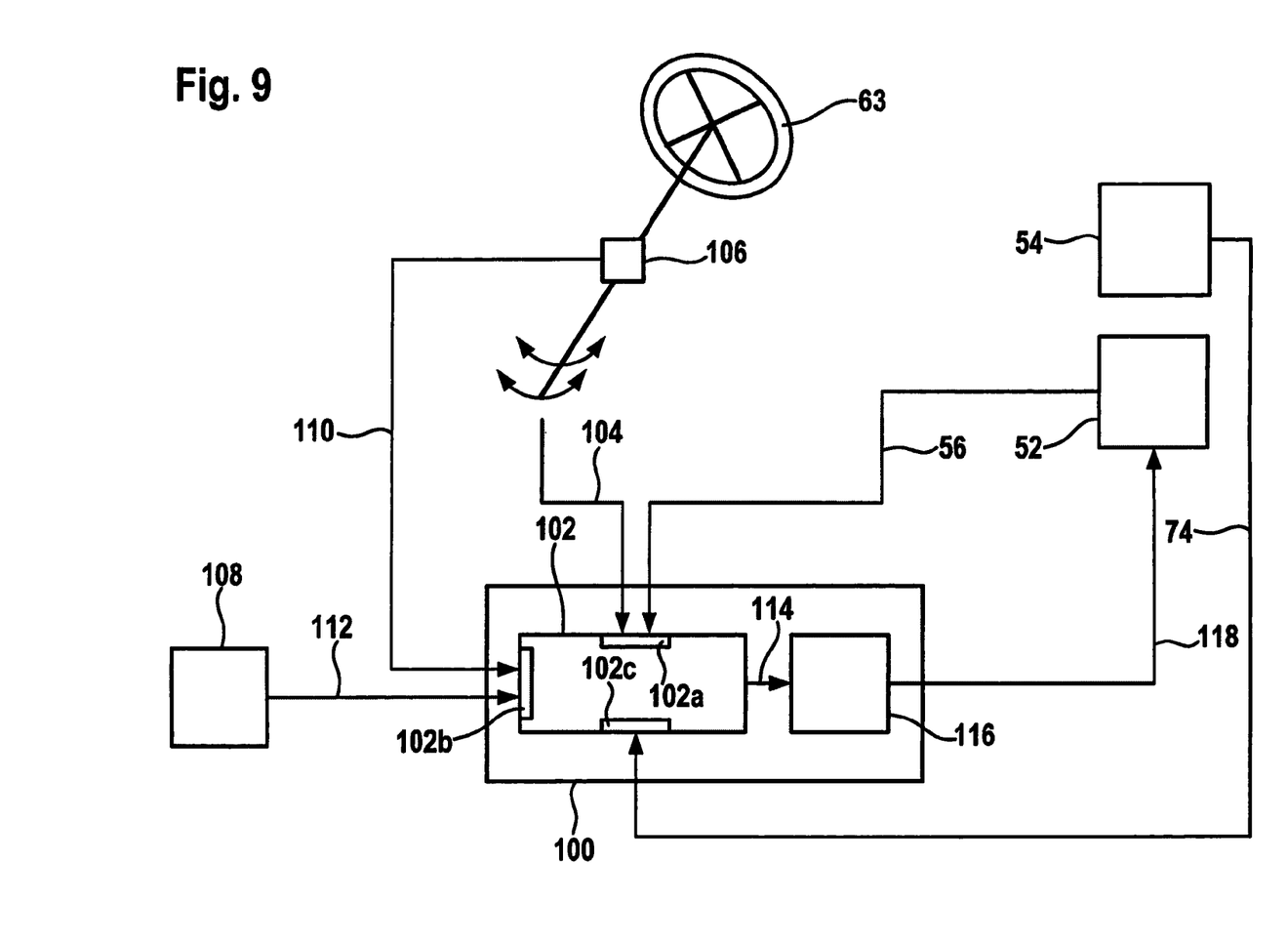
FIG. 9 shows a schematic illustration of the device for checking the ability to implement a predefined setpoint travel direction variable for a vehicle.

FIG. 9 shows a schematic illustration of the device for checking the ability to implement a predefined setpoint travel direction variable for a vehicle.

Device 100 for checking the ability to implement a predefined setpoint travel direction variable may be designed to cooperate with previously described automatic vehicle control systems 52 and 54. For example, device 100 has a first signal input 102a for receiving output signal 56 of automatic vehicle control system 52. In this case, output signal 56 contains a predefined setpoint travel direction variable which is set on steering wheel 63 and/or on at least one of the wheels using, for example, an automatic steering system (not illustrated). Alternatively or additionally, first signal input 102a may also be designed to receive a setpoint travel direction variable specified by a driver. To specify the setpoint travel direction variable, the driver operates steering wheel 63, for example. In this case a steering wheel signal 104 containing the predefined setpoint travel direction variable is provided to first signal input 102a.

First signal input 102a is connected to a comparator 102, which is described in greater detail below. Comparator 102 is also connected to a second signal input 102b. Second signal input 102b is used to receive at least one adjustment force for adjusting steering wheel 63 and/or a wheel (not illustrated) of the vehicle when the instantaneous direction of travel of the vehicle changes according to the predefined setpoint travel direction variable. The at least one adjustment force is provided by at least one sensor 106 and 108 of the vehicle via a sensor signal 110 and 112.

For example, sensor 106 is designed to ascertain the adjustment force applied by an automatic steering system and/or by a driver for adjusting steering wheel 63, and for outputting same via sensor signal 110. The adjustment of steering wheel 63 causes a change in the instantaneous position of the wheels. Sensor 108 ascertains the adjustment force necessary for moving the at least one wheel, and provides same via sensor signal 112.

Comparator 102 is designed to compare the at least one adjustment force to at least one predefined comparative value, and to output a comparative signal 114, according to the comparison, to an evaluation device 116. If the adjustment force corresponds to the at least one predefined comparative value, and the adjustment force is within a value range and/or is less than a predefined threshold value, for example, evaluation device 116 concludes that the predefined setpoint travel direction variable is maintainable for the vehicle. An appropriate information signal 118 may then be output to at least one device of the vehicle. Information signal 118 is preferably output to first automatic vehicle control system 52. First automatic vehicle control system 52 thus receives notification that the at least one setpoint travel direction variable (the provided parking trajectory, for example) continues to be maintainable for the vehicle.

However, if the at least one adjustment force deviates from the at least one comparative value by at least a minimum difference, evaluation device 116 concludes that the ability to implement the predefined setpoint travel direction variable for the vehicle does not correspond to a desired standard. An appropriate information signal 118 may then be output to automatic vehicle control system 52.

First automatic vehicle control system 52 thus learns via information signal 118 that the original maximum steering wheel angle and/or the original maximum wheel angle for the vehicle may no longer be reliably implemented. After receiving such an information signal 118, first automatic vehicle control system 52 preferably computes only setpoint travel direction variables (parking trajectories) whose steering wheel angles and/or wheel angles are less than values which have proven to be unsuitable.

In one example embodiment, evaluation device 116 is designed, after concluding that the ability to implement the predefined setpoint travel direction variable for the vehicle does not correspond to a desired standard, to redetermine the maximum steering wheel angle which may be implemented and/or the maximum wheel angle which may be implemented. The at least one redetermined angle may then be output via information signal 118 to first automatic vehicle control system 52. The at least one redetermined angle is then taken into account by first automatic vehicle control system 52 in ascertaining an advantageous setpoint travel direction variable.

Evaluation device 116 may also be designed to activate a display device or announcement device of the vehicle for displaying and/or announcing a message to the driver. The displays and/or announcements preferably contain information that the ability to implement the predefined setpoint travel direction variable for the vehicle does not correspond to a desired standard. The driver then has the option to find a repair facility.

By comparing multiple adjustment forces to multiple comparative values, it is possible in particular to ascertain causes for the unsatisfactory ability to implement the predefined setpoint travel direction variable. This cause may then be communicated to the driver. This reduces the costs of repair.

In one example embodiment, device 100 has a third signal input 102c for receiving data signal 74 described above. The at least one comparative value may thus be suitably selected with regard to a vehicle inclination and/or a coefficient of friction of the roadway traveled on at that moment.

What is claimed is:

1. A control device configured to ascertain the ability to implement a predefined setpoint steering angle for controlling a vehicle, comprising:
  a first signal input configured to receive the predefined setpoint steering angle based on a setpoint travel direction specified by at least one of a driver and an automatic vehicle control system;
  a second signal input configured to receive at least one steering wheel adjustment force, wherein the adjustment force is ascertained by at least one sensor of the vehicle for adjusting at least one of a steering wheel and a wheel of the vehicle when the instantaneous direction of travel of the vehicle changes according to the setpoint steering angle and the adjustment force is applied to a steering wheel of the vehicle to implement the predefined setpoint steering angle;
  a comparator configured to (i) compare the adjustment force to at least one predefined comparative value and compare an ascertained actual maximum steering angle to a stored maximum steering angle value, and (ii) provide a comparative signal according to these comparisons; and
  an evaluation device configured to (i) receive the comparative signal, (ii) determine that the ability to implement the predefined setpoint steering angle for the vehicle does not correspond to a selected standard if at least one of the adjustment force deviates from the at least one predefined comparative value by at least a first predetermined minimum difference and the actual maximum steering angle deviates from the stored maximum steering angle value by at least a second predetermined minimum difference, and (iii) provide an information signal indicative of the determination regarding the ability to implement the predefined setpoint steering angle, wherein the information signal is output to at least one of the automatic vehicle control system, a display device for informing the driver, and an announcement device for informing the driver.

2. The control device as recited in claim 1, further comprising:
a storage unit for storing at least one of an output value of a maximum steering wheel angle allowed to be implemented and an output value of a maximum wheel angle of the vehicle allowed be implemented;
wherein the evaluation device is further configured to redefine, after receiving the comparative signal, at least one of the maximum steering wheel angle allowed to be implemented and the maximum wheel angle of the vehicle allowed be implemented, if the adjustment force deviates from the at least one predefined comparative value by at least the predetermined minimum difference, and wherein the information signal output to the automatic vehicle control system includes information regarding at least one of the redefined maximum steering wheel angle allowed to be implemented and the redefined maximum wheel angle allowed to be implemented.

3. The control device as recited in claim 1, wherein the evaluation device is further configured to rule out at least one possible cause for the deviation of the adjustment force from the at least one predetermined comparative value by at least the predetermined minimum difference, by comparing multiple adjustment forces to multiple comparative values.

4. The control device as recited in claim 1, further comprising:
a third signal input configured to receive at least one of a vehicle inclination ascertained by a further sensor of the vehicle and a coefficient of friction of a traveled roadway ascertained by a further sensor of the vehicle;
wherein the comparator is further configured to ascertain from a predefined set of comparative values at least one comparative value corresponding to at least one of the vehicle inclination and the coefficient of friction of the traveled roadway.

5. A method for ascertaining the ability to implement a predefined setpoint steering angle for controlling a vehicle, comprising:
receiving the setpoint steering angle based on a setpoint travel direction specified by at least one of a driver and an automatic vehicle control system;
changing an instantaneous direction of travel of the vehicle according to the setpoint steering angle;
ascertaining a steering wheel adjustment force applied to a steering wheel of the vehicle to implement the setpoint steering angle when the instantaneous direction of travel changes for adjusting at least one of the steering wheel and a wheel of the vehicle;
comparing the ascertained adjustment force to at least one predefined comparative value;
comparing an ascertained actual maximum steering angle to a stored maximum steering angle value;
determining that the ability to implement the predefined setpoint steering angle for the vehicle does not correspond to a selected standard if at least one of the adjustment force deviates from the at least one predefined comparative value by at least a first predetermined minimum difference and the actual maximum steering angle deviates from the stored maximum steering angle value by at least a second predetermined minimum difference; and
at least one of (i) displaying visual information to the driver indicating the determination regarding the ability to implement the predefined setpoint steering angle, (ii) providing audio information to the driver indicating the determination regarding the ability to implement the predefined setpoint steering angle, and (iii) outputting to the automatic vehicle control system an informational signal indicative of the determination regarding the ability to implement the predefined setpoint steering angle.

6. A device for controlling an automatic steering system of a vehicle, comprising:
a signal input unit configured to receive a setpoint steering angle based on a setpoint travel direction specified by an automatic vehicle control system;
a memory device storing at least one correction factor and configured to facilitate read out of the correction factor;
a control unit configured to (i) ascertain a corrected setpoint steering angle on the basis of the correction factor, the setpoint travel direction, and the setpoint steering angle, (ii) apply a force to a steering wheel associated with the corrected steering angle instead of the setpoint steering angle specified by the automatic vehicle control system, and (iii) switch the automatic steering system to an operating mode for maintaining the corrected setpoint steering angle; and
an evaluation device configured to (i) receive an actual maximum steering angle ascertained by a steering sensor of the vehicle, (ii) compare the actual maximum steering angle to a stored maximum steering angle value, and (iii) if the actual maximum steering angle deviates from the stored maximum steering angle value by at least a predetermined minimum difference, adjust the correction factor based on the comparison and store the adjusted correction factor in the memory device.

7. The device as recited in claim 6, wherein the evaluation device is further configured to rule out at least one possible cause for the deviation of the actual steering angle from the setpoint steering angle by the at least the predetermined minimum difference, by comparing the actual steering wheel angle to the setpoint steering wheel angle, and by comparing the actual wheel angle to the setpoint wheel angle.

8. The device as recited in claim 6, further comprising:
a further signal input unit configured to receive at least one of (i) a vehicle inclination ascertained by a further sensor of the vehicle and (ii) a coefficient of friction of a traveled roadway ascertained by a further sensor of the vehicle;
wherein the memory device stores multiple correction factors, and wherein the control unit is configured to read out from the multiple correction factors stored in the memory device a selected correction factor corresponding to the at least one of the vehicle inclination and the coefficient of friction of the traveled roadway.

9. A method for controlling an automatic steering system of a vehicle, comprising:
a) receiving a setpoint steering angle based on a setpoint travel direction specified by an automatic vehicle control system;
b) reading out a stored correction factor;
c) ascertaining a corrected steering angle based on the correction factor, the setpoint travel direction, and the setpoint steering angle;

d) applying a force to a steering wheel associated with the corrected steering angle instead of the setpoint steering angle specified by the automatic vehicle control system;

e) switching the automatic steering system to an operating mode for maintaining the correction factor;

f) ascertaining an actual maximum steering angle from a steering sensor of the vehicle;

g) comparing the actual maximum steering angle to a stored maximum steering angle value;

h) redefining the correction factor according to the comparison if the actual maximum steering angle deviates from the stored maximum steering angle value by at least a predefined minimum difference; and i) storing the redefined correction factor for at least one iteration of a) through e).

10. The method of claim 9, wherein the setpoint steering angle is a setpoint angle of the steering wheel and the actual steering angle is an angle determined from a steering wheel angle sensor.

11. The method of claim 9, wherein the setpoint steering angle is a setpoint angle of a wheel and the actual steering angle is an angle determined from a wheel angle sensor.

12. The method of claim 9, further comprising evaluating an instantaneous applied force of an electronic steering system for an active parking guidance system to ascertain the actual maximum steering angle.

13. The method of claim 9, further comprising evaluating an instantaneous applied force of a power steering for a passive parking guidance system to ascertain the actual maximum steering angle.

14. The method of claim 9, further comprising:

communicating a parking trajectory computed by a parking assistance system to a driver during a parking cycle;

measuring a steering wheel force applied by the driver during the parking cycle to ascertain the maximum steering angle;

comparing the measured steering wheel force to a stored steering wheel force value corresponding to the stored maximum steering angle value; and redefining the correction factor according to the comparing when the measured steering wheel force deviates from the store steering wheel force value by at the predefined minimum difference.

* * * * *

UNITED STATES PATENT AND TRADEMARK OFFICE
CERTIFICATE OF CORRECTION

PATENT NO. : 8,457,843 B2  Page 1 of 1
APPLICATION NO. : 12/737251
DATED : June 4, 2013
INVENTOR(S) : Volker Niemz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 77 days.

Signed and Sealed this
Eighth Day of September, 2015

Michelle K. Lee
*Director of the United States Patent and Trademark Office*